United States Patent [19]
Tokushima et al.

[11] Patent Number: 5,958,228
[45] Date of Patent: Sep. 28, 1999

[54] METHOD OF AND AN APPARATUS FOR PRODUCING A MINERAL WATER

[75] Inventors: Kazuo Tokushima, Kariya; Akiko Ito, Nagoya, both of Japan

[73] Assignee: Nippondenso Co., Ltd., Japan

[21] Appl. No.: 08/702,160

[22] Filed: Aug. 23, 1996

[30]     Foreign Application Priority Data

Aug. 24, 1995  [JP]  Japan  .................................... 7-215651
Sep. 11, 1995  [JP]  Japan  .................................... 7-232377
Jun. 19, 1996  [JP]  Japan  .................................... 8-157984

[51] Int. Cl.$^6$ ..................................................... A23L 2/00
[52] U.S. Cl. ........................... 210/199; 210/143; 210/205; 422/261; 426/66; 426/238
[58] Field of Search ...................... 426/66, 238; 210/143, 210/198.1, 199, 205, 206; 422/261, 128; 99/275

[56]            References Cited

U.S. PATENT DOCUMENTS

| | | | |
|---|---|---|---|
| 3,855,914 | 12/1974 | Nishino et al. | 99/275 |
| 3,874,277 | 4/1975  | Sonetaka et al. | 99/275 |
| 3,936,364 | 2/1976  | Middle | 426/66 |
| 3,956,132 | 5/1976  | Takemitsu . | |
| 4,720,374 | 1/1988  | Ramachandran | 422/261 |
| 4,787,973 | 11/1988 | Ando et al. | 210/282 |
| 5,034,138 | 7/1991  | Hatanaka et al. | 210/749 |

FOREIGN PATENT DOCUMENTS 8206667  8/1996  Japan .

OTHER PUBLICATIONS

Patent Abstracts of Japan, Kiichi, 59269337, Dec. 20, 1984, *Apparatus for Producing Continuously Mineral Water.*
Patent Abstracts of Japan, Terukazu, 56208551, Dec. 22, 1981, *Mineral Water Producing Device.*
Patent Abstracts of Japan, Yukichi, 63041431, Feb. 24, 1988, *Device for Producing Mineral Water.*
Patent Abstracts of Japan, Norimori, 04117017, Apr. 8, 1992, *Structure of Water Purifying and Activating Device.*
Patent Abstracts of Japan, Noboru, 02152001, Jun. 11, 1990, *Water Purification Device.*
Derwent Abstract, Hitachi, JP850012494, Jan. 28, 1985, *Filter Release Mineral Water Comprise Mould Heat Coarse Powder Insoluble Synthetic Resin.*

*Primary Examiner*—Jay H. Woo
*Assistant Examiner*—Betsey J. Morrison
*Attorney, Agent, or Firm*—Pillsbury Madison & Sutro, LLP

[57]            ABSTRACT

An apparatus for producing a mineral water is provided with a mineral source having a mineral element containing a soluble mineral component. Plain water is supplied to the mineral source. The mineral component dissolves in the plain water when the soluble mineral of the mineral element is brought into contact with the plain water. Ultrasonic waves are applied to the mineral source by an ultrasonic source. The conditions for applying ultrasonic waves to the mineral source is controlled to prepare a mineral water which contain mineral component according to a user's requirements or liking.

11 Claims, 8 Drawing Sheets

METHOD OF AND AN APPARATUS FOR PRODUCING A MINERAL WATER

BACKGROUND OF THE INVENTION

1. Field of the Invention

The present invention relates to a method of and an apparatus for producing a mineral water. In particular, the invention relates to a method and an apparatus suitable for producing a drinkable mineral water for business purposes at a restaurant or for domestic purposes in a home, which can adjust the concentration of minerals in the mineral water produced or the concentration ratio between the minerals depending on a user's requirements

2. Description of the Related Art

A known apparatus for producing a mineral water has a cartridge with a mineral source therein, such as mineral grains, for supplying minerals, such as calcium, potassium and magnesium into plain water such as city water or service water passing through the cartridge.

An apparatus for producing a mineral water, which is disclosed in Japanese Unexamined Patent Publication (Kokai) No. 3-26392, includes a porous mineral source with minute pores in its surface to increase the area of contact between plain water and the mineral source. Ultrasonic waves are applied to the mineral source to increase the amount of mineral dissolved in the plain water. Applying ultrasonic waves disturbs the flow of plain water over the surface of the mineral source which promotes the dissolution of the mineral components in the plain water.

Although the apparatus of Japanese Unexamined Patent Publication (Kokai) No. 3-26392 can produce a mineral water with a fixed mineral concentration and/or a fixed concentration ratio between minerals, the apparatus cannot produce a mineral water with the mineral concentration and the concentration ratio between minerals adjusted to meet a user's requirements since the apparatus applies the ultrasonic waves under fixed conditions.

SUMMARY OF THE INVENTION

The present invention is directed to solve the prior art problem, and to provide a method of and an apparatus for producing a mineral water, which can adjust the concentration of minerals in the produced mineral water and the concentration ratio between the respective minerals, according to a user's requirements.

The present invention uses a porous mineral source with numerous minute pores in its surface to increase the area of contact between the plain water and the porous mineral source. Plain water comes into contact with the mineral source when the plain water passes through a mineral supply unit containing the mineral source, and the mineral components of the mineral source dissolve in the plain water. Ultrasonic waves are applied to the mineral source to promote the dissolution of the mineral components of the mineral source. Applying ultrasonic waves makes the plain water seep into the minute pores in the surface of the mineral source, and disturbs the flow of plain water over the surface of the mineral source in order to make the minerals dissolved in plain water disperse. The rate of dissolution of the mineral in plain water varies when the conditions for applying ultrasonic waves is varied.

Accordingly, as claimed in claims 1, 2 and 3, by varying the conditions for applying ultrasonic waves to the mineral source, such as the frequency or intensity of ultrasonic waves, the mineral concentration of the mineral water can be adjusted to a user's requirements or a user's liking so that a mineral water with desired mineral concentration is produced.

Different mineral sources, of different minerals, release different mineral components in plain water under different solubilities and at different concentration ratios between the respective mineral components. The dissolution of different minerals in plain water and/or the concentration of the respective mineral components in mineral water can be varied by using multiple mineral sources, each of which contains different minerals soluble in plain water under solubilities different from each other, and by varying the flow rate of the plain water distributed to the respective mineral sources.

According to the invention, the multiple mineral sources differing from each other in dissolving properties of the mineral components that dissolve in plain water and/or in contents of the mineral components are packed in the mineral supply unit (2), and the percentages of plain water distributed to the plurality of mineral source are varied to adjusted the dissolution of the mineral components of the plurality of mineral source, so that different types of mineral water containing different minerals and differing from each other in the concentrations of the minerals can be produced to a user's requirements and to a user's liking.

According to the invention claimed in claim 5, different types of mineral water containing different minerals and differing from each other in ratio between the mineral concentrations can be produced to a user's requirements and to a user's liking by varying the percentages of plain water distributed to the plurality of mineral sources, and the dissolution of the mineral components in plain water can be adjusted by varying the conditions for applying ultrasonic waves to the mineral source by the control means. Accordingly, the minerals can be made to dissolve in plain water in desired concentrations and at desired concentration ratios by varying the conditions for applying the ultrasonic waves to the mineral source and the percentages of plain water distributed to the mineral source.

According to the invention claimed in claim 6, the ultrasonic source (15) is actuated while plain water is flowing through the mineral supply unit (2) internally holding the mineral source, and the vibrations of the ultrasonic source are transmitted through plain water to the mineral source. When ultrasonic waves are thus applied to the mineral source, plain water seeps in the minute pores in the surface of the mineral source, the flow of plain water over the surface of the mineral source is disturbed and, consequently, the minerals dissolved in plain water are dispersed, whereby the dissolution of the minerals in plain water is promoted. The dissolution of the minerals can be adjusted at a user's requirements and to a user's liking by controlling the conditions for applying ultrasonic waves to the mineral source, such as the frequency and intensity of the ultrasonic waves, by the control means, whereby mineral water containing the minerals in desired concentrations can be produced.

According to the inventions claimed in claims 7, 9 and 11, the percentages of plain water distributed to the mineral source can be varied by adjusting the percentages of plain water distributed to the branch pipes (6a, 6b) by the flow adjusting means (8). Consequently, the dissolution of the minerals can be adjusted and different types of mineral water containing different minerals and differing from each other in ratio between the concentrations of the minerals can be produced at a user's requirements and to a user's liking.

According to the invention, different types of mineral water containing different minerals and differing from each other in ratio between the concentrations of the minerals can be produced at a user's requirements and to a user's liking by varying the percentages of plain water distributed to the plurality of minerals supply materials, and the dissolution of the minerals in plain water can be adjusted by varying the conditions for applying ultrasonic waves to the mineral source by the control means. Accordingly, the minerals can be made to dissolve in plain water at a desired ratio and in desired concentrations by varying the conditions for applying ultrasonic waves to the mineral source and the percentages of plain water distributed to the mineral source.

According to the invention, the valve (8) is disposed at the junction of the water feedpipe (6) and the branch pipes (6a, 6b). Therefore, the quantities of plain water distributed to the branch pipes (6a, 6b) can be adjusted by a single valve, the number of necessary valves can be reduced and the percentages of plain water distributed to the branch pipes can be adjusted by simple control.

According to the invention, the water purifying material (13) is filled in a portion of the interior of the mineral supply unit (2) at a position below the mineral source with respect to the flowing direction of plain water. Therefore, chlorine and impurities contained in plain water can be removed and, even if the mineral source is fractured into fragments by the application of ultrasonic waves, the fragments can be removed by the water purifying material to prevent the inclusion of the fragments of the mineral source in mineral water.

According to the invention claimed in claim 13, the vibrations of the ultrasonic source (15) are transmitted through the vibrations transmission case (16) to the mineral source. Since the walls (16a, 16b, 16c) of the vibrations transmission case vibrate as well as the ultrasonic source, the vibrations of the ultrasonic source can efficiently be transmitted through a large area to the mineral source and, consequently, the dissolution of minerals can be promoted.

Since the vibrations transmission case is surrounded by the mineral source, the vibrations of the ultrasonic source can propagate from the inside toward the outside of the mineral supply unit (2). Therefore, in the apparatus for producing a mineral water, the distance between a portion of the mineral source farthest from the vibrations transmission case, and the outer surface of the vibrations transmission case is short as compared with the distance in an apparatus for producing a mineral water in which a ultrasonic source is disposed at one end of a mineral supply unit, and hence the vibrations of the ultrasonic source can be transmitted throughout the mineral source before the vibrations are attenuated. Consequently, the vibrations of the ultrasonic source can effectively be transmitted throughout the mineral source, whereby the dissolution of the minerals can be promoted.

According to the invention claimed in claim 14, the vibrations transmission case (16) is disposed so that the walls (16a, 16b, 16c) thereof in contact with the mineral source are at a fixed distance from the corresponding inner surfaces of the mineral supply unit facing the outer surfaces of the vibrations transmission case. Therefore, the vibrations of the ultrasonic source can be transmitted at a uniform intensity to the mineral source.

According to the invention claimed in claim 15, the ultrasonic source (15) can be disposed at inner position in the mineral supply unit (2) and hence the vibrations of the ultrasonic source can be more uniformly transmitted to the mineral source.

According to the invention claimed in claim 16, at least two types of mineral source among the plurality of types of mineral source are in contact with the walls (16a, 16b. 16c) of the vibrations transmission case. Therefore, the vibrations of the ultrasonic source can be transmitted at least two types of mineral source, whereby the dissolution of the minerals can be promoted.

The above and other objects, features, and advantages of the present invention will be made more apparent from the ensuing description of a preferred embodiment in conjunction with the accompanying drawings wherein.

DESCRIPTION OF THE PREFERRED EMBODIMENT

Preferred embodiments of the present invention will be described hereinafter with reference to the accompanying drawings.

Figure 1:
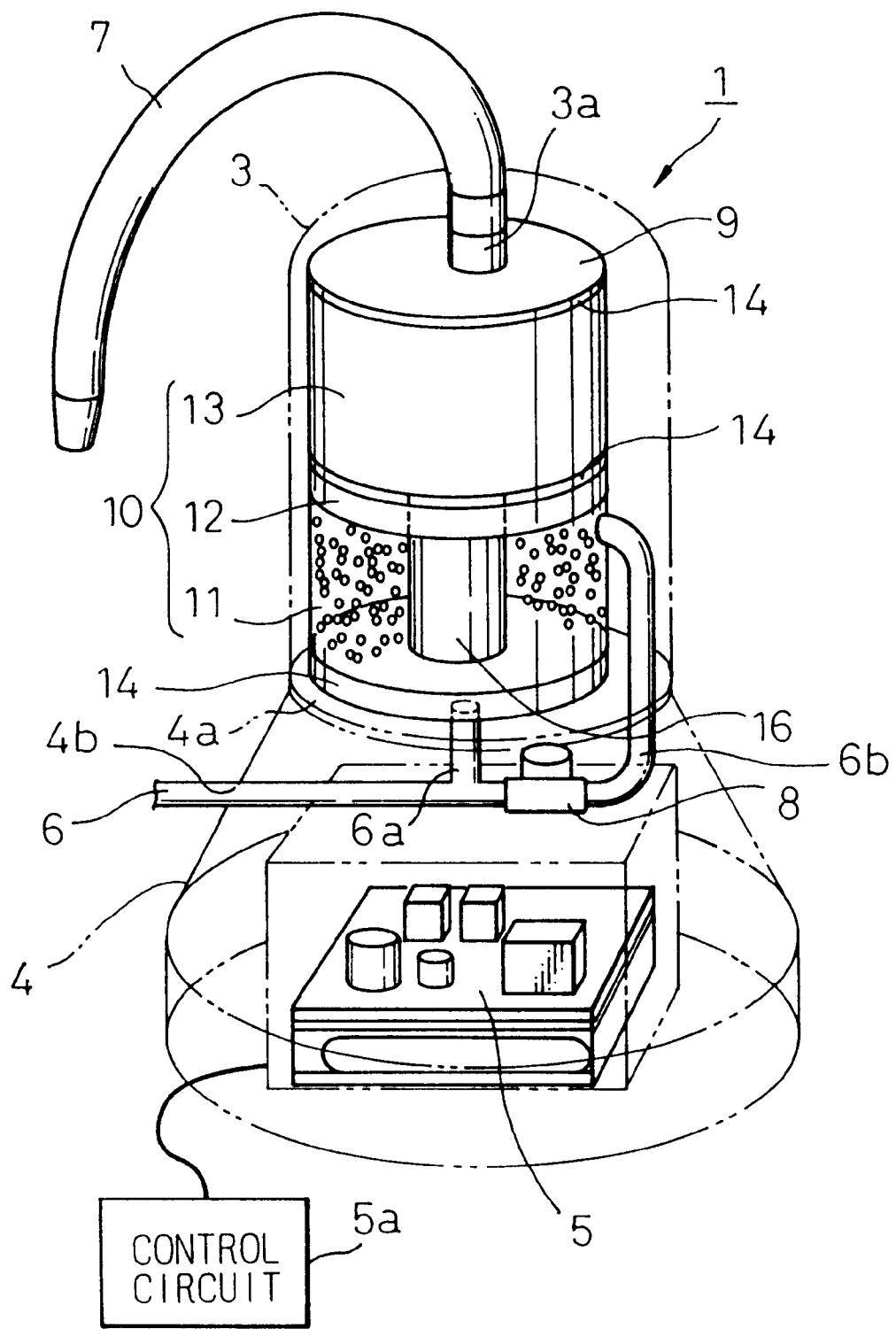
FIG. 1 is a transparent, typical perspective view of an apparatus 1 for producing a mineral water in a first embodiment according to the present invention.

FIG. 1 is a schematic section of an apparatus 1 for producing a mineral water according to the first embodiment of the invention The apparatus 1 has a cylindrical top housing 3 of a resin, and a bottom housing 4 disposed under the top housing 3. A cylindrical mineral supply unit 2 is provided as a mineral source in the top housing 3.

The bottom housing 4 is made of a resin in the form of a frustum tubular cone. A partition plate 4a is placed between the top housing 3 and the bottom housing 4. The top and bottom housings 3 and 4 are connected to each other in a water-tight manner. The bottom housing 4 encloses an ultrasonic oscillator 5.

The mineral supply unit 2 has a substantially cylindrical cartridge 9. Provided within the cartridge 9 is a mineral element 10 including soluble mineral components for supplying mineral components to plain water that flows therethrough. Disposed within the mineral supply unit 2 is a vibrations transmission case 16 of stainless steel. An ultrasonic source 15 is provided within the vibrations transmission case 16. Ultrasonic waves generated by the ultrasonic source 16 are transmitted to the mineral elements 10 through the vibrations transmission case 15.

A projection, not shown, extends along the outer surface of the cylindrical wall of the cartridge 9 and, on the other hand, a substantially vertical guide groove, not shown, is provided in the inner surface of the cylindrical wall of the top housing 3. When inserting the mineral supply unit 2 into the top housing 3, the projection engages the guide groove of the top housing 3 to slide along the guide groove. The engagement between the projection and the guide groove secures the mineral supply unit 2 to the top housing 3.

The mineral element 10 is formed, as shown in FIG. 1, by stacking a first mineral supply layer 11, a second mineral supply layer 12 and a water purifying layer 13, which are provided in that order from the upstream side toward the downstream side with respect to the flow of plain water directed to the mineral supply unit 2. In this embodiment, the first mineral supply layer 11 and the second mineral supply layer 12 include crushed fragments of granite porphyry and coral limestone, respectively. The water purifying layer 13 is composed of activated carbon, i.e., a water purifying material.

Filters 14, such as sheets of non-woven fabric, are interposed between the lower end of the cartridge 9 and the first mineral supply layer and between the upper end of the cartridge 9 and the water purifying layer 13, respectively, to prevent the mineral element 10 from coming out the mineral supply unit 2. Another filter 14 in the form of a sheet of non-woven fabric is interposed between the activated carbon layer 13 and the second mineral supply layer 12 to prevent the water purifying material from mixing with the mineral source.

The vibrations transmission case 16 is a substantially cylindrical body with a diameter smaller than that of the cartridge 9. An ultrasonic source 15, which will be described later, is fixedly disposed inside the vibrations transmission case 16. An opening, not shown, is formed in the lower end wall of the vibrations transmission case 16 and wiring lines connecting the ultrasonic source 15 to an ultrasonic oscillator 5 are extended through the opening. The opening is sealed in a water-tight fashion by a sealing member so that water may not leak into the vibrations transmission case 16.

The vibrations transmission case 16 is disposed substantially coaxial with the cartridge 9, the bottom wall 16c of the vibrations transmission case 16 is fixed to the central portion of the bottom wall of the cartridge 9, and the top wall of the same is located within the second mineral supply layer 12. Thus, the cylindrical side wall 16b and the top wall 16a of the vibrations transmission case 16 extend inside the mineral source within the mineral supply unit 2.

Figure 2A:
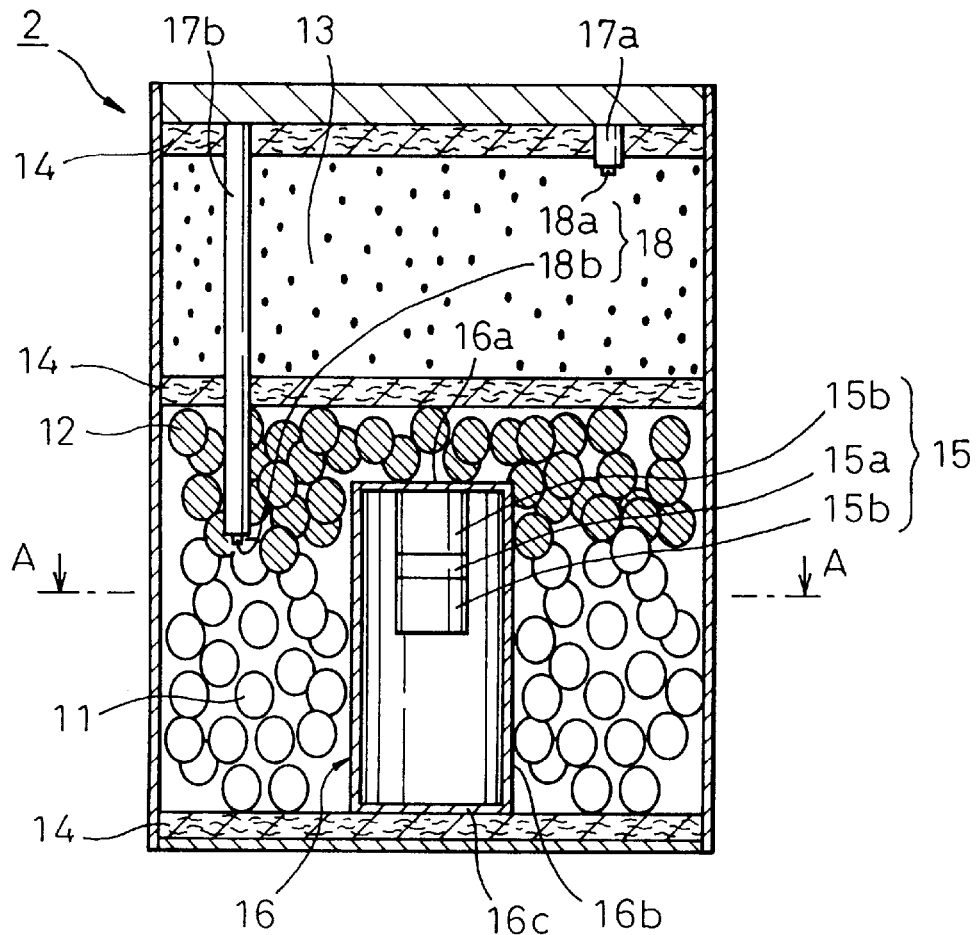
FIG. 2A is a typical longitudinal sectional view of a cartridge.
Figure 2B:
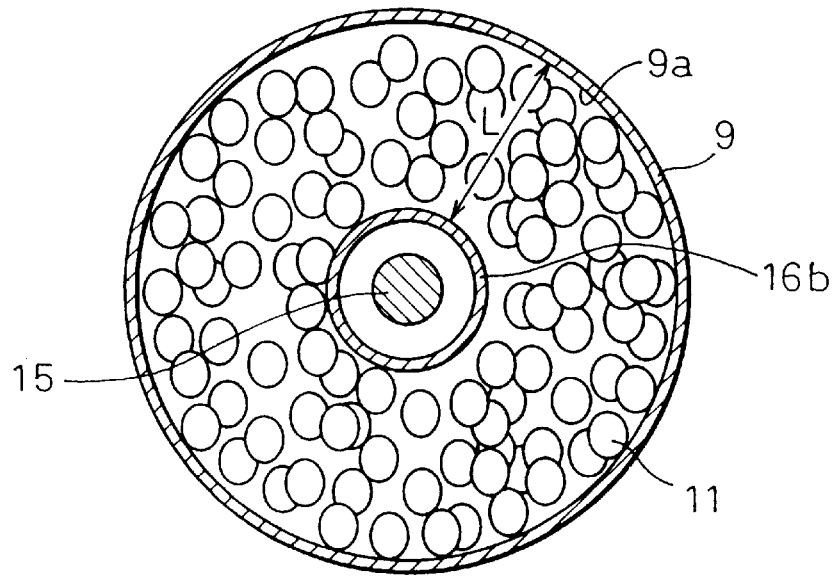
FIG. 2B is a sectional view taken on line A—A in FIG. 2A.

The ultrasonic source 15 is a substantially cylindrical piezoelectric device formed by attaching horn parts 15b made of, for example aluminum, to the opposite ends of a substantially cylindrical PZT (lead zirconate titanate) element 15a. The ultrasonic source 15 is attached adhesively to the inner surface of the top wall of the vibrations transmission case 16 with an epoxy resin or the like. The ultrasonic source 15, the vibrations transmission case 16 and the cartridge 9 are concentrically disposed so that the distance L (FIG. 2B) between the outer circumference of the ultrasonic source 15 and the inner surface of the side wall 9a of the cartridge 9 is substantially constant.

The ultrasonic source 15 is connected to the ultrasonic oscillator 5 by wiring lines, not shown. The ultrasonic oscillator 15 is controlled by a control circuit 5a to control the conditions for ultrasonic waves application, such as the frequency and the intensity of ultrasonic waves generated by the ultrasonic source 15.

Substantially cylindrical electrode holders 17a and 17b, made of a resin, extend from the inner surface of the top wall 9a of the cartridge 9 into the cartridge 9, and bacteriostatic electrodes 18 are held on the electrode holders 17a and 17b. The extremity of the electrode holder 17a is located in the water purifying layer 13, and the extremity of the electrode holder 17b is located at a position near the boundary between the first mineral supply layer 11 and the second mineral supply layer 12 in the first mineral supply layer 11.

The bacteriostatic electrodes 18 comprise a bar-shaped positive electrode 18a of carbon and a bar-shaped negative electrode 18b of aluminum. The positive and negative electrodes 18a and 18b are held by the electrode holders 17a and 17b to project from the extremities of the electrode holders 17a and 17b, respectively. Therefore, the end of the positive electrode 18a is in the water purifying layer 13 and that of the negative electrode 18b is in the first mineral supply layer 11.

A water line has a water feed pipe 6 which provides a water supply means, connected to a faucet, not shown, to supply plain water into the mineral supply unit 2, and a mineral water discharge pipe 7 which provides a mineral water discharge means, to discharge mineral water, produced by passing the plain water through the mineral supply unit 2, outside from the apparatus 1 for producing a mineral water. The water feed pipe 6 extends from a faucet through an opening 4b provided in the side wall of the bottom housing 4 into the bottom housing 4, then branches into branch pipes 6a and 6b within the bottom housing 4.

The branch pipe 6a penetrates a substantially central portion of the partition plate 4a placed on the upper end of the bottom housing 4 into the top housing 3, and the extremity of the branch pipe 6a is joined to a substantially central portion of the bottom wall of the cartridge 9. The branch pipe 6b extends beyond the branch pipe 6a toward the side wall of the bottom housing 4 and penetrates the partition plate 4a placed on the upper end of the bottom housing 4 into the top housing 3. In the top housing 3, the branch pipe 6b extends along the side surface of the mineral supply unit 2 and the extremity of the branch pipe 6b is joined to the cylindrical side wall of the cartridge 9 at a position corresponding to the first mineral supply layer 11 and near the second mineral supply layer 12.

A control valve 8, the degree of opening of which is adjustable, is disposed in the branch pipe 6b. The percentage of plain water distributed from the water feed pipe 6 to the branch pipe 6b can be adjusted by adjusting the opening of the valve 8, so that both the percentages of plain water distributed to the branch pipes 6a and 6b can be adjusted. The valve 8 is a flow adjusting means.

The mineral water discharge pipe 7 is inserted through an opening 3a provided in the top wall of the top housing 3 and is joined to the top wall of the cartridge 9 of the mineral supply unit 2 in the top housing 3.

The operation of the apparatus 1 for producing a mineral water will be described hereinafter.

Plain water flows through the water feed pipe 6 into the apparatus 1, and then the plain water flows through the branch pipes 6a and/or 6b into the mineral supply unit 2. As the plain water flows through the first mineral supply layer 11 and the second mineral supply layer 12, the mineral components, such as Ca and Mg, of the mineral source dissolve in the plain water to add the mineral components to the plain water.

Subsequently, the water thus processed flows through the water purifying layer 13b. As the processed water flows through the water purifying layer 13, chlorine and the like are adsorbed by activated carbon, and impurities are filtered to produce purified mineral water. Then purified mineral water is discharged through the mineral water discharge pipe 7 from the apparatus 1 for producing a mineral water.

In this embodiment, the PZT element 15a generates vibrations when the ultrasonic oscillator 5 is activated while the apparatus 1 is in operation. The vibrations of the PZT element 15a are amplified by the horn parts 15b. The vibrations of the ultrasonic source 15 are transmitted to the vibrations transmission case 16 to which the ultrasonic source 15 is secured.

Since the vibrations transmission case 16 is disposed within the mineral supply unit 2 with its the top and side walls 16a and 16b in contact with the first and second mineral supply layer 11 in this embodiment, the vibrations of the ultrasonic source 15 are transmitted through the vibrations transmission case 16 to the first and second mineral supply layers 11 and 12.

Since the mineral elements are porous, the raw water seeps into the minute pores in the surfaces of the mineral elements which ensures a large area of contact between the mineral elements and the raw water. Since the flow of the plain water in the vicinity of the surfaces of the mineral elements is disturbed, the mineral components dissolved in plain water are dispersed, whereby the dissolution of the minerals in plain water is promoted.

The flow rate of the plain water from the water feed pipe 6 into the branch pipe 6b is controlled by adjusting the degree of opening of the valve 8, thus the ratio of the plain water distributed between the branch pipes 6a and 6b can be controlled.

The plain water directed to the branch pipe 6a flows into the mineral supply unit 2 and flows further through the first and second mineral supply layers 11 and 12. The plain water directed to the branch pipe 6b flows into the mineral supply unit 2 and flows further through the second mineral supply layer 12. Thus, the ratio between the flow rate of the plain water that flows through the first mineral supply layer 11 and that does not flow through the second mineral supply layer 12 can be varied.

The dissolution of the mineral components can be adjusted by varying the conditions for the application of ultrasonic waves to the mineral elements. Further, when making the mineral components of a plurality of types of mineral elements dissolve in plain water, the ratio between the concentration of the mineral components in mineral water can be adjusted by varying the flow rate of the plain water directed to the respective branches.

Explanation will be given of experiments conducted to examine the effect of the variation of conditions for applying ultrasonic waves to the mineral elements on the dissolution of the mineral components. The frequency and the intensity of ultrasonic waves applied to the mineral source were varied.

First, an experiment in which the frequency of ultrasonic waves applied to the mineral elements was varied will be explained
Experiment 1
Distilled water without any contained minerals was passed through the mineral supply unit 2 at a flow rate of 4 l/min, and ultrasonic waves of 28 kHz, 45 kHz, 100 kHz and 1700 kHz were applied to the mineral elements. The concentration of the mineral components in the produced mineral water was measured. The cartridge 9 of the mineral supply unit 2 was 83 mm in inside diameter and 210 mm in height. The cartridge 9 was packed with 200 g of granite porphyry as a mineral element. Ultrasonic waves of 0.1 W/cm$^2$ and 0.3 W/cm$^2$ in intensity were used. The rest of the arrangement of an apparatus for producing a mineral water employed in the experiment was the same as described above. Hence the description thereof will be omitted. Results of Experiment 1 are shown in FIG. 3.

Figure 3:
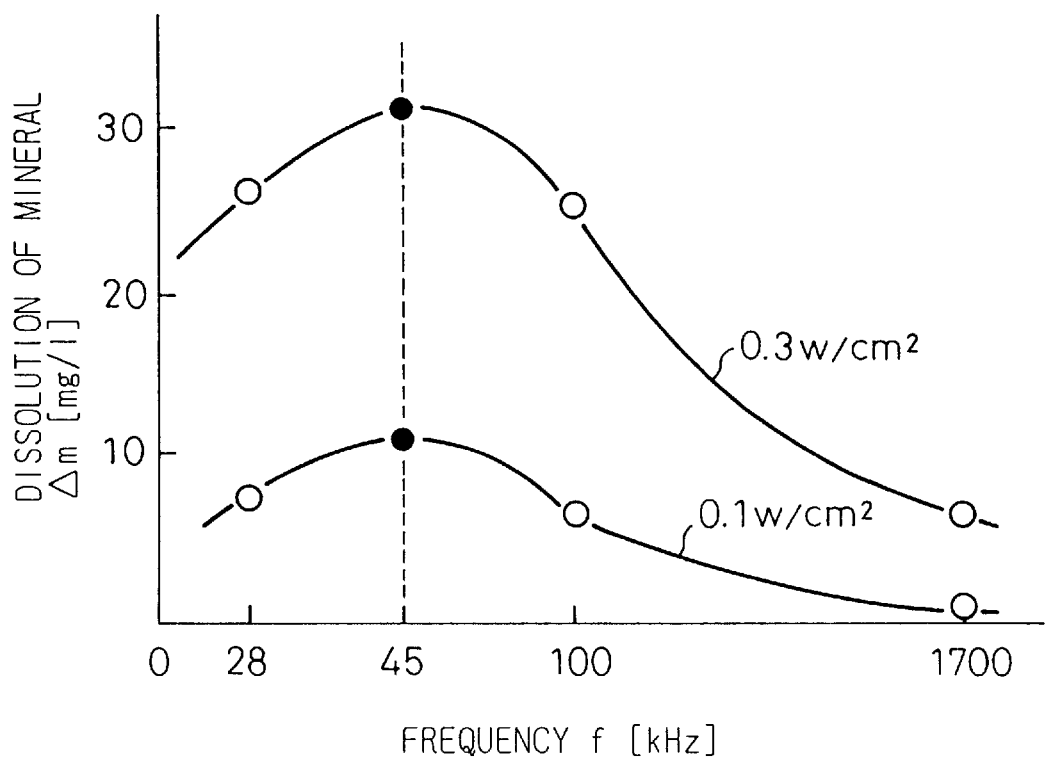
FIG. 3 is a graph showing the dependence of mineral concentration on the frequency of ultrasonic waves applied to the cartridge for different intensities of ultrasonic waves determined through Experiment 1.

FIG. 3 is a graph showing the dependence of mineral concentration on the frequency of ultrasonic waves for intensities of 0.1 W/cm$^2$ and 0.3 W/cm$^2$. As is apparent from FIG. 3, the mineral concentration varied with the variation of the frequency in both cases of the intensity of ultrasonic waves at 0.1 W/cm$^2$ and 0.3 W/cm$^2$. This shows that the mineral concentration is controlled by varying the frequency. Both the concentration curves for 0.1 W/cm$^2$ and 0.3 W/cm$^2$ have peaks, respectively, at a frequency of 45 kHz. It is known from the results of Experiment 1 that the mineral concentration is large when the frequency of ultrasonic waves is in the range of 30 to 60 kHz. Therefore, a desirable frequency range is 30 to 60 kHz.

Another experiment will be explained, in which the intensity of ultrasonic waves to be applied to the mineral elements was varied.
Experiment 2
Distilled water without any contained minerals was passed through the mineral supply unit 2 at a flow rate of 4 l/min, and the intensity of ultrasonic waves applied to the mineral elements was varied. The concentration of the mineral components in the produced mineral water was measured. The cartridge 9 of the mineral supply unit 2 was 83 mm in inside diameter and 210 mm in height. The cartridge 9 was packed with 150 g of granite porphyry as a mineral element. Ultrasonic waves of 28 kHz, 45 kHz and 100 kHz were applied to the mineral elements. The rest of the arrangement of an apparatus employed in the experiment was the same as described above. Hence the description thereof will be omitted. Results of experiments using ultrasonic waves of 28 kHz, 45 kHz and 100 kHz are shown in FIGS. 4A, 4B and 4C, respectively.

Figure 4A:
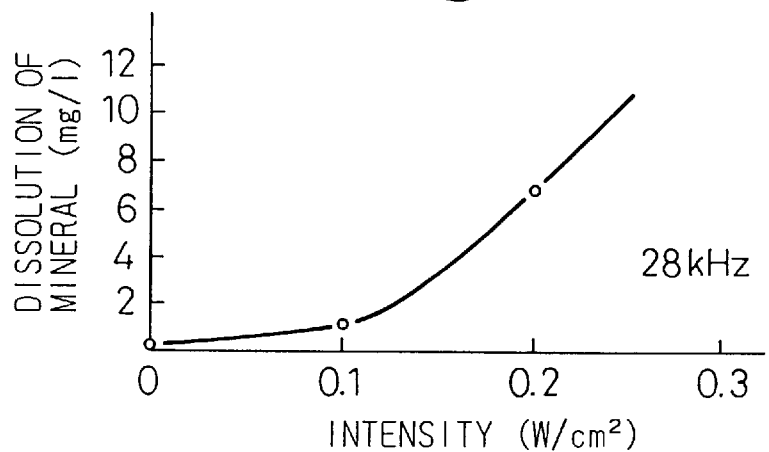
FIGS. 4A, 4B and 4C are graphs showing the dependence of mineral concentration on the intensity of ultrasonic waves applied to the cartridge for frequencies of 28 kHz, 45 kHz and 100 kHz, respectively, determined through Experiment 2.
Figure 4B:
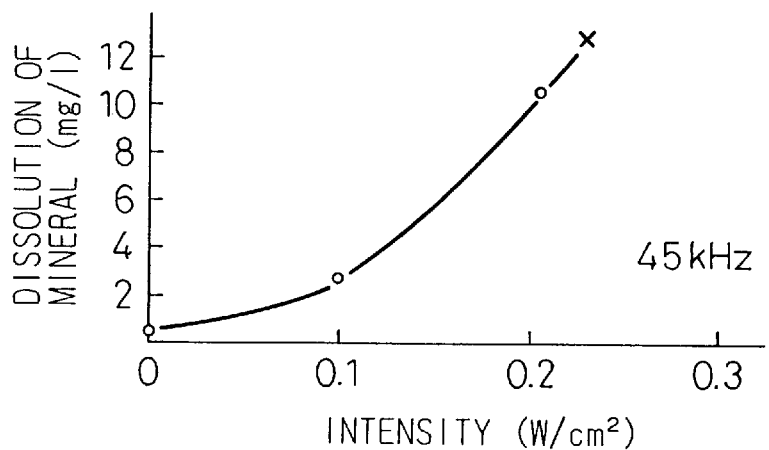
Figure 4C:
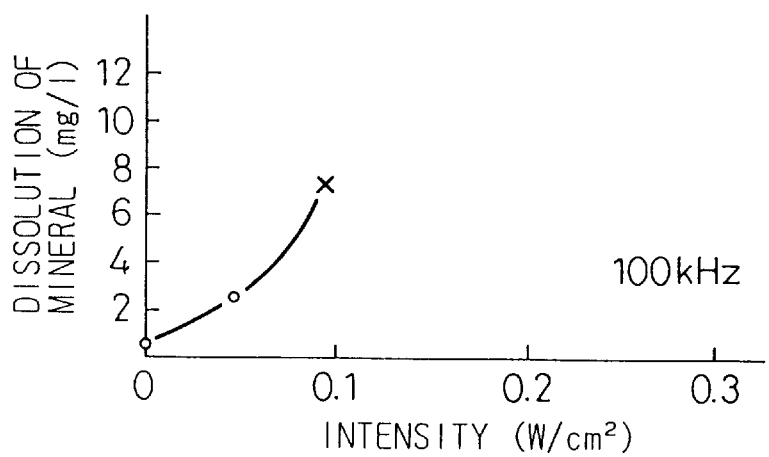

As is apparent from FIGS. 4A, 4B and 4C, the mineral concentration increases as the intensity of ultrasonic waves increases for all the frequencies of 28 kHz, 45 kHz and 100 kHz. This shows that the mineral concentration can be controlled by varying the intensity of ultrasonic waves to be applied to the mineral elements.

An explanation will be given of an experiment in which a cartridge packed with a plurality of types of mineral elements was used. The experiment was conducted to examine the effect of the ratio between the flow rate of plain water directed to the respective types of mineral elements on the dissolution of the mineral components in the water processed. In order to vary the flow rate directed to the respective types of the mineral elements, first, the mixing ratio of the respective types of the mineral elements were varied, and second, the flow rate of the plain water directed to a plurality of flow passages connected to the cartridge was varied.

First, an explanation will be given of an experiment in which the mixing ratio of the respective types of the mineral elements were varied.
Experiment 3
Distilled water without any contained minerals was passed through the mineral supply unit 2 at a flow rate of 4 l/min, and ultrasonic waves of 40 kHz and 0.25 W/cm² were applied to mineral elements contained in the cartridge 9. The concentration of Ca and Mg in the processed water was measured. The cartridge 9 of the mineral supply unit 2 was 83 mm in inside diameter and 210 mm in height. The cartridge 9 was packed with 200 g of mineral elements. The mineral elements were a mixture of granite porphyry and coral limestone, which are different from each other in dissolubility and contents of mineral components. The mixing ratio between the coral limestone and granite porphyry was varied between 0% of coral limestone, that is 100% of granite porphyry, to 100% of coral limestone, that is 0% of granite porphyry. The apparatus used in the experiment is substantially the same as the apparatus described above. Hence, the detailed description thereof will be omitted. Results of the experiment are shown in FIG. 5, in which a continuous curve and a broken curve indicate the variation of the Ca concentration and the Mg concentration, respectively, in the processed water.

Figure 5:
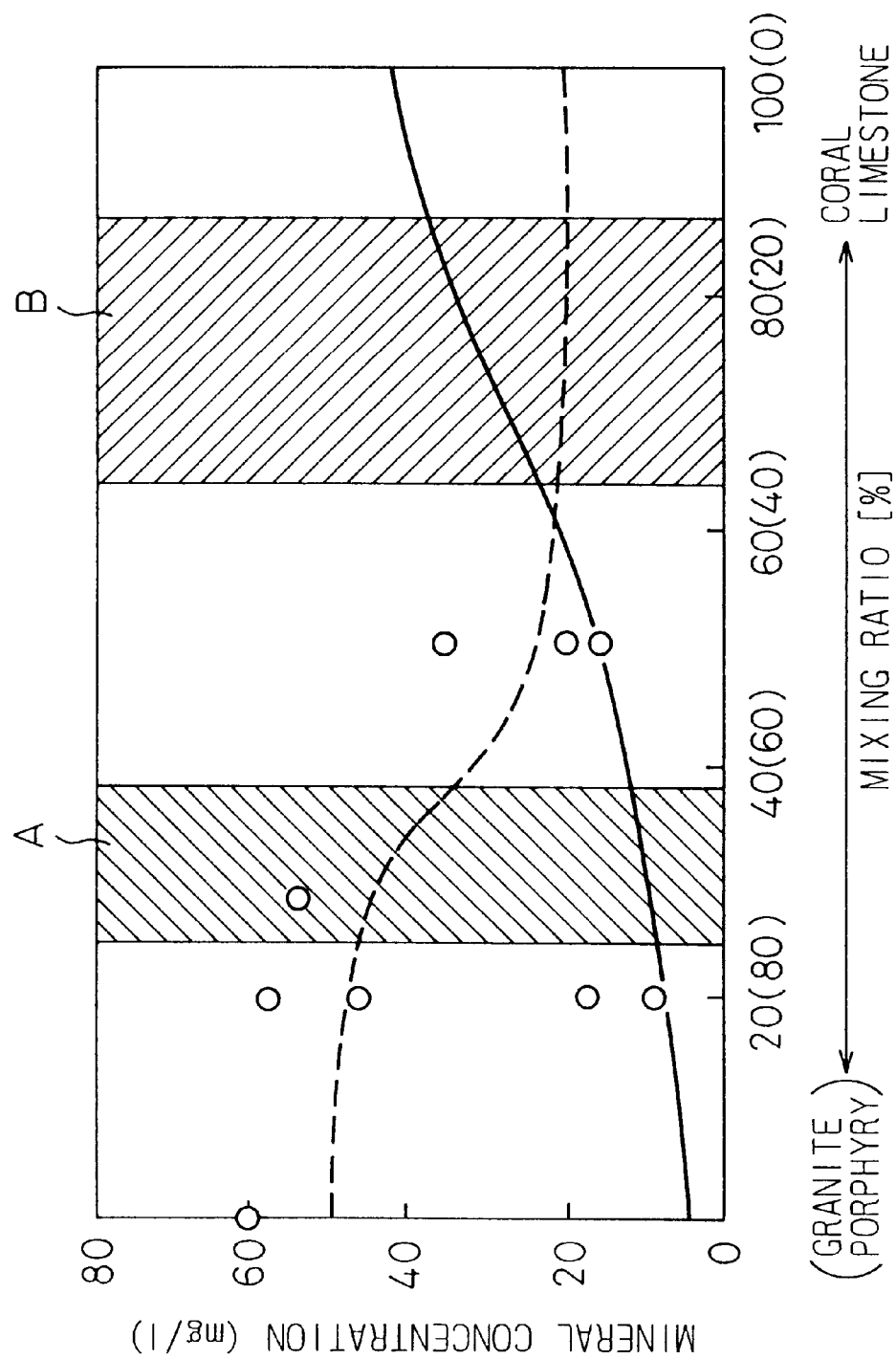
FIG. 5 is a graph showing the dependence of Ca concentration and Mg concentration on the ratio between the percentages of granite porphyry and coral limestone packed in the cartridge determined through Experiment 3.

As is apparent from FIG. 5, when the mixing ratio of granite porphyry in the mineral elements packed in the mineral supply unit 2 is greater than the coral limestone, the Mg concentration of the processed water is greater than the Ca concentration. The Ca concentration increases gradually and the Mg concentration decreases gradually as the coral limestone content in the mineral elements increases. The Ca and Mg concentration are approximately equal to each other when the mixing ratio is 60% of granite porphyry and 40% of coral limestone. The Ca concentration becomes greater than the Mg concentration when the coral limestone increases beyond 60%. It will be understood from FIG. 5 that, when the cartridge 9 is packed with a mixture of different types of mineral elements, the concentration of the mineral components in the processed water can be controlled by varying the mixing ratio of the mineral elements or the ratio between the flow rate directed to the respective types of mineral elements.

For instance, a mineral water of Ca, K and Mg concentration of 10–15 mg/l, 40–55 mg/l and 40–55 mg/l, respectively, can be produced by a mixture of coral limestone and granite porphthyre of 25–35% and 75–65% (mixing ratio range A in FIG. 5). A mineral water of Ca, K and Mg concentration of 20–35 mg/l, 35–50 mg/l and 35–50 mg/l, respectively, can be produced by a mixture of the coral limestone and granite porphyry of 65–85% and 35–15% (mixing ratio range B in FIG. 5).

An explanation will be given of an experiment using an apparatus provided with a cartridge packed with a plurality of types of mineral elements and a water feed pipe branched into a plurality of branch pipes. In the experiment, conditions for applying ultrasonic waves to the mineral elements were varied and the flow rate of plain water directed to the branch pipes were controlled.

Experiment 4

Distilled water without any contained minerals was passed through the mineral supply unit 2 at a flow rate of 4 l/min, and ultrasonic waves of 40 kHz were applied to the mineral elements in cartridge 2. The intensity was controlled as shown in Table 1. Mineral concentration of Ca, Mg and K in the processed water was measured. The cartridge 9 of the mineral supply unit 2 was 83 mm in inside diameter and 210 mm in height. The cartridge 9 was packed with layers of 430 g of granite porphyry, 200 g of coral limestone and 70 g of fibrous activated carbon stacked in that order from the downstream side. The apparatus used in the experiment is substantially the same as the apparatus described above. Hence, the detailed description thereof will be omitted. The experimental results are tabulated in Table 1. In Table 1, the passage I corresponds to the branch pipe 6a, and the passage II corresponds to the branch pipe 6b. The opening of the valve was adjusted to adjust the flow rate of the plain water directed to the branch pipes.

TABLE 1

| No. | Flow Passage | Flow Rate Coral Layer | Flow Rate Granite Layer | Intensity of Ultrasonic Waves (W/cm²) | Concentration of Mineral (mg/l) Ca | Mg | K |
|---|---|---|---|---|---|---|---|
| Example 1 | I | 80% | 20% | 0.25 | 28 | 4.0 | 2.5 |
| Example 2 | I | 80% | 20% | 0.10 | 15 | 3.0 | 1.5 |
| Example 3 | I&II | 60% | 40% | 0.20 | 10 | 4.8 | 2.0 |

With reference to Table 1, it is known from the comparative examination of results of Examples 1 and 2, in which plain water was supplied into the mineral supply unit 2 through only the flow passage I, that the Ca, Mg and K concentration in Example 1, in which the intensity of ultrasonic waves is higher than that of Example 2, are higher than the Ca, Mg and K concentration in Example 2. However, there was no significant difference between the ratios of the Ca, Mg and K concentration in Example 1 and Example 2.

It is further known from the comparative examination of results of Examples 1 and 2, in which plain water was supplied into the mineral supply unit 2 only through the flow passage I so that 80% of the plain water flows through the granite porphyry layer 11, and those of Example 3, in which the raw water was supplied into the mineral supply unit 2 through both the passages I and II so that 60% of the plain water flows through the granite porphyry layer 11, that the ratio of Mg concentration to the Ca concentration in Example 3 is far greater than that in Examples 1 and 2, and the ratio of K concentration to the Ca concentration in Example 3 is slightly greater than those in Examples 1 and 2.

As is apparent from Table 1, the percentages of water distributed to the mineral elements can be varied and the ratio between the mineral concentrations of mineral water can be varied by varying the percentages of plain water distributed to the branch pipes.

Incidentally, once the interior of the mineral supply unit 2 is contaminated with bacteria, the bacteria are liable to propagate because water stagnates in the mineral supply unit 2 while the apparatus 1 for producing a mineral water is inoperative.

This embodiment applies ultrasonic waves to the mineral elements to increase the mineral concentrations of produced mineral water. Bacteria are liable to propagate in the mineral elements while the apparatus for producing a mineral water is inoperative. An explanation will be given of experiments conducted to examine the bacteriostatic effect of ultrasonic waves application to water in the cartridge.

Experiment 5

Figure 6:
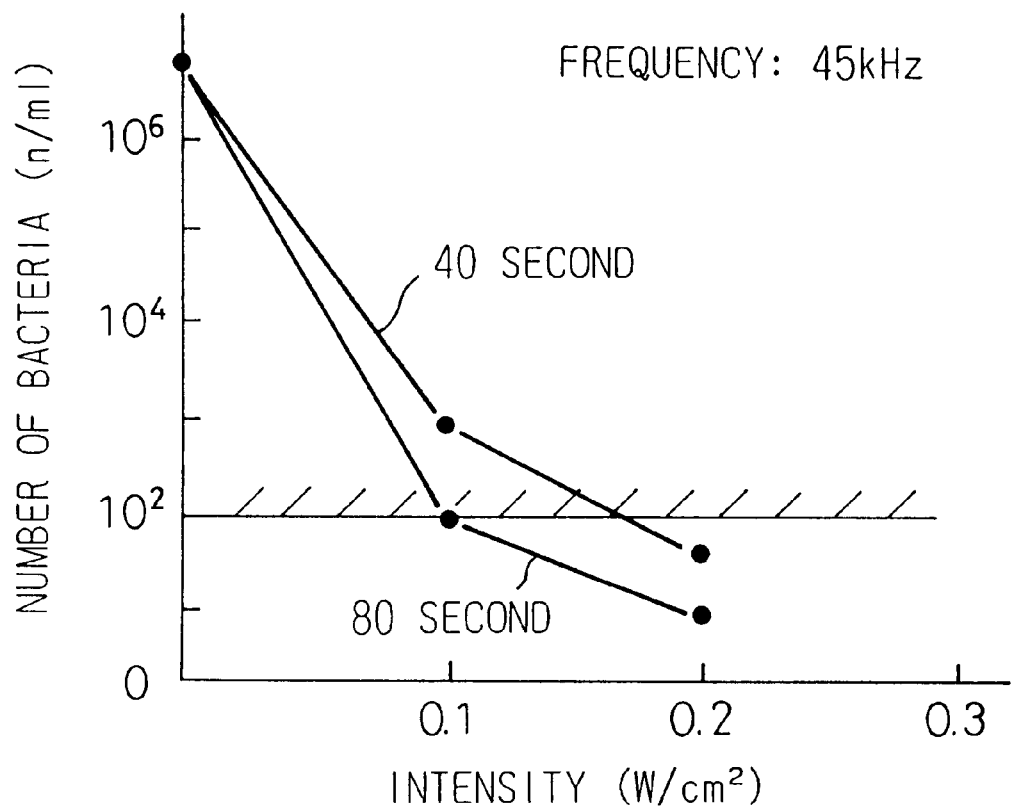
FIG. 6 is a graph showing the bactericidal effect of the application of ultrasonic waves to the cartridge determined through Experiment 5.

The mineral supply unit 2 was filled with distilled water and the number of bacteria contained in distilled water was measured by JIS (Japanese Industrial Standard) K0102, to evaluate the bacteriostatic effect of ultrasonic waves application to the mineral elements. Bacteria were cultured in standard agar media at 36±1° C. for 24±2 hr, and the numbers of bacterial colonies on the agar media were counted by a colony counter. The cartridge 9 of the mineral supply unit 2 was 83 mm in inside diameter and 210 mm in height. The cartridge 9 was packed with 140 g of coral limestone and 60 g of fibrous activated carbon as the water purifying material The mineral supply unit 2 was exposed to the ultrasonic waves of 45 kHz in frequencies 0 W/cm$^2$, 0.1 W/cm$^2$ and 0.2 W/cm$^2$ in intensity for 40 sec and 80 sec. The results of the measurements are shown in FIG. 6.

From a general sanitary point of view, the desirable number of bacteria are 10 num./ml or below. As shown in FIG. 6, the number of bacteria contained in the sample water decreases sharply, regardless of the duration of ultrasonic waves application, as the intensity of ultrasonic waves was increased. The number of bacteria in the sample water was less than the desired upper limit number of bacteria when the sample water was exposed to ultrasonic waves of 0.1 W/cm$^2$ for 80 sec. Also, the number of bacteria in the sample water was less than the desired upper limit number of bacteria when the sample water was exposed to ultrasonic waves of 0.2 W/cm$^2$ for 40 sec. It will be understood from FIG. 6 that the propagation of bacteria in a water staying in the mineral supply unit 2 can be prevented by applying ultrasonic waves to the mineral elements.

Another method of suppressing the propagation of bacteria employs electrodes immersed in water. In this embodiment, the propagation of bacteria contained in water staying in the mineral supply unit 2 can be suppressed by energizing the bacteriostatic electrodes 18.

Since the water purifying layer 13 is formed of activated carbon which is electrically conductive, the water purifying layer 13 in contact with the positive electrode 18a is charged positively when the electrodes 18 are energized. Since bacteria are negatively charged in water, bacteria are attracted to the surface of the activated carbon forming the water purifying layer 13. The coenzyme of bacteria attracted to the activated carbon is oxidized, whereby the metabolism of the bacteria is limited. Consequently, the propagation of bacteria is suppressed and sanitary mineral water can be produced.

In this embodiment, the conditions for ultrasonic waves application to the mineral elements through the ultrasonic source 15 is controlled by a control means. Therefore, the concentration of the mineral components in the mineral water can be adjusted by controlling the conditions for ultrasonic waves application according to a user's requirements. Controlling the flow rate of the plain water directed to the respective mineral layers, through adjusting the flow rate to the branch pipes 6a and 6b by the control valve 8, allows to adjust the concentration of the respective mineral components in the prepared water according to a user's requirements.

Controlling the conditions for ultrasonic waves application to the mineral elements and the flow rate of the plain water directed to the respective mineral layers enables preparation of a mineral water having mineral concentrations and a ratio between mineral concentrations according to a user's requirements.

The flow rate of the plain water directed to the respective branch pipes 6a and 6b is simply adjusted by adjusting the degree of opening of the control valve 8 disposed in the branch pipe 6a.

As is apparent from the foregoing description, this embodiment of the present invention has the mineral supply unit 2 provided with the water purifying layer 13 in addition to the first mineral supply layer 11 and the second mineral supply layer 12. The water purifying layer 13 is provided downstream of the mineral supply layers 11 and 12 in the mineral supply unit 2. Therefore, fragments of the mineral supply materials, which may be produced by the application of ultrasonic waves to the mineral elements, are removed from the prepared water as well as chlorine and impurities contained in plain water.

Since the ultrasonic source 15 is disposed within the vibrations transmission case 16, the vibrations from the ultrasonic source 15 are transmitted through the vibrations transmission case 16 to the mineral elements. Therefore, the walls 16a, 16b and 16c of the vibrations transmission case 16 vibrate as well as the ultrasonic source 15 with the vibrations from the ultrasonic source 15 propagating through a relatively large area to the mineral elements to promote the dissolution of the mineral components from the mineral elements.

Furthermore, since the vibrations transmission case 16 is disposed within the mineral supply unit 2 so as to be surrounded by the mineral elements, the vibrations from the ultrasonic source 15 is transmitted from the inside toward the outside of the first and second mineral supply layer 11 and 12. This reduces the distance between the vibrations surface and the outermost portion of the mineral elements so that the vibrations of the ultrasonic source 15 is efficiently transmitted to those remote portions of the mineral elements. Consequently, the vibrations of the ultrasonic source 15 can effectively be transmitted throughout the mineral elements and hence the dissolution of the mineral components of the mineral elements into the plain water can be promoted.

Particularly, securing the ultrasonic source 15 to the inner surface of the wall of the vibrations transmission case 16, i.e., the inner surface of the top wall of the vibrations transmission case 16, opposite the wall 16c attached to the cartridge 9, improves the uniform transmission of the vibrations from the ultrasonic source 15 to the mineral elements.

Since the top and the cylindrical side walls 16a and 16b of the vibrations transmission case 16 contact the first and second mineral supply layers 11 and 12, the vibrations of the ultrasonic source 15 can be transmitted to the layers of the different types of mineral elements, which promotes the dissolution of the mineral components.

Since the vibrations transmission case 16 is disposed concentrically with the cartridge 9 so that, in the circumferential direction, the side wall 16b is at substantially an equal distance from the side wall 9a of the cartridge 9. Similarly, the ultrasonic source 15 is concentric with the cartridge 9 so that the outer surface of the ultrasonic source 15 is at substantially an equal distance from the side wall 9a of the cartridge 9. Thus, the vibrations are uniformly transmitted from the ultrasonic source 15 to the mineral elements. Therefore, the vibrations of the ultrasonic source 15 can be transmitted, before attenuated, to portions of the mineral elements remote from the vibrations transmission case 16, and hence the vibrations of the ultrasonic source 15 can efficiently be transmitted to the mineral elements. Such efficient transmission of the vibrations with a sufficiently high intensity from the ultrasonic source 15 to the portions of the mineral elements remote from the vibrations transmission case 16 promotes the dissolution of the mineral components of the mineral elements.

Second Embodiment

Figure 7:
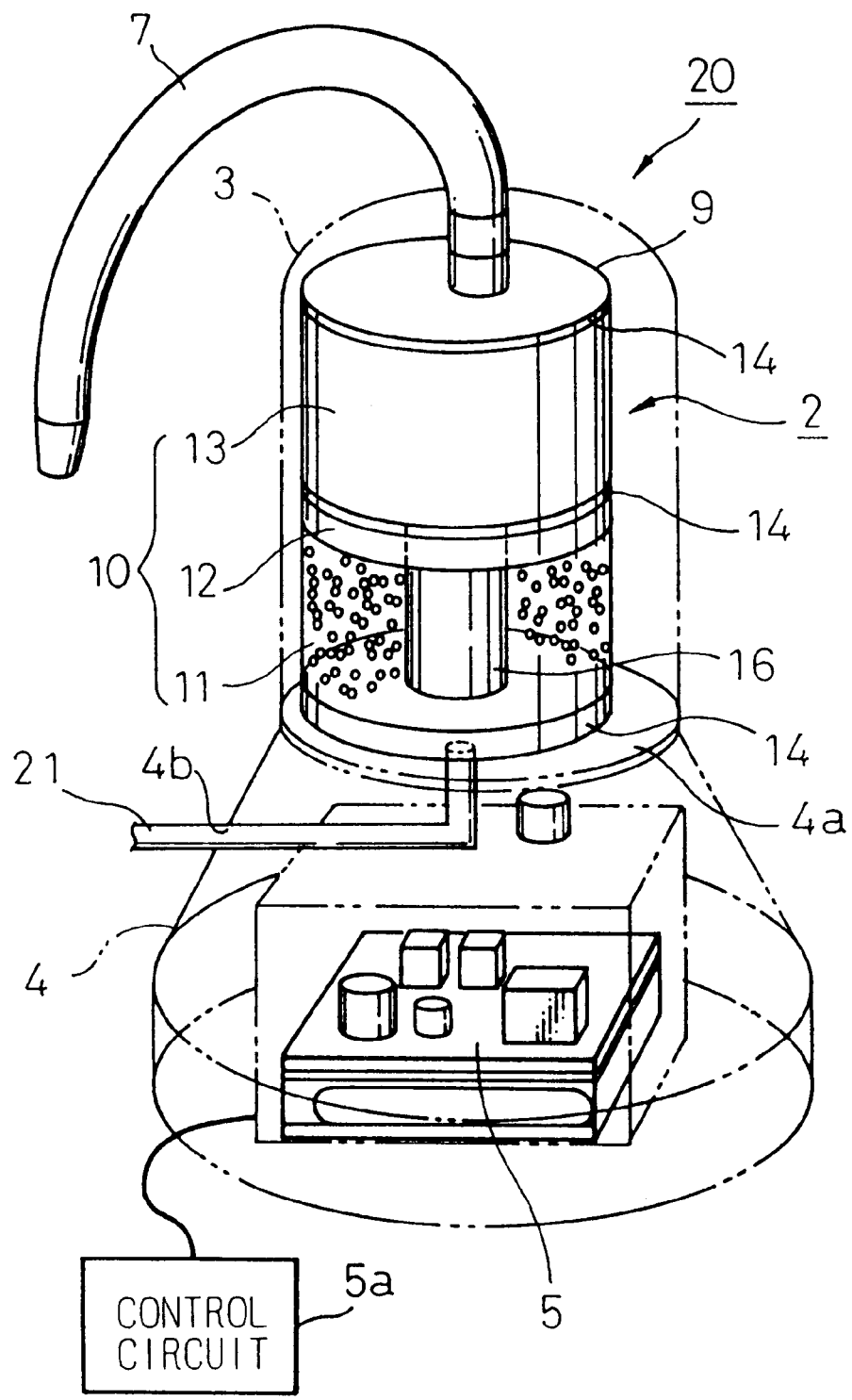
FIG. 7 is a transparent, typical perspective view of an apparatus for producing a mineral water in a second embodiment according to the present invention.

As described above, the apparatus for producing a mineral water according to the first embodiment varies the conditions for applying ultrasonic waves to the mineral elements and controls the flow rate of the plain water directed to the mineral elements. As shown in FIG. 7, an apparatus for producing a mineral water 20 according to the second embodiment of the present invention has a water feed pipe 21 connected to a mineral supply unit 2. Conditions for applying ultrasonic waves to mineral elements contained in the mineral supply unit 2 is also varied to control the dissolution of the mineral components into the prepared water. In FIG. 7, parts like or corresponding to those of the first embodiment are designated by the same reference numbers.

Third Embodiment

Figure 8:
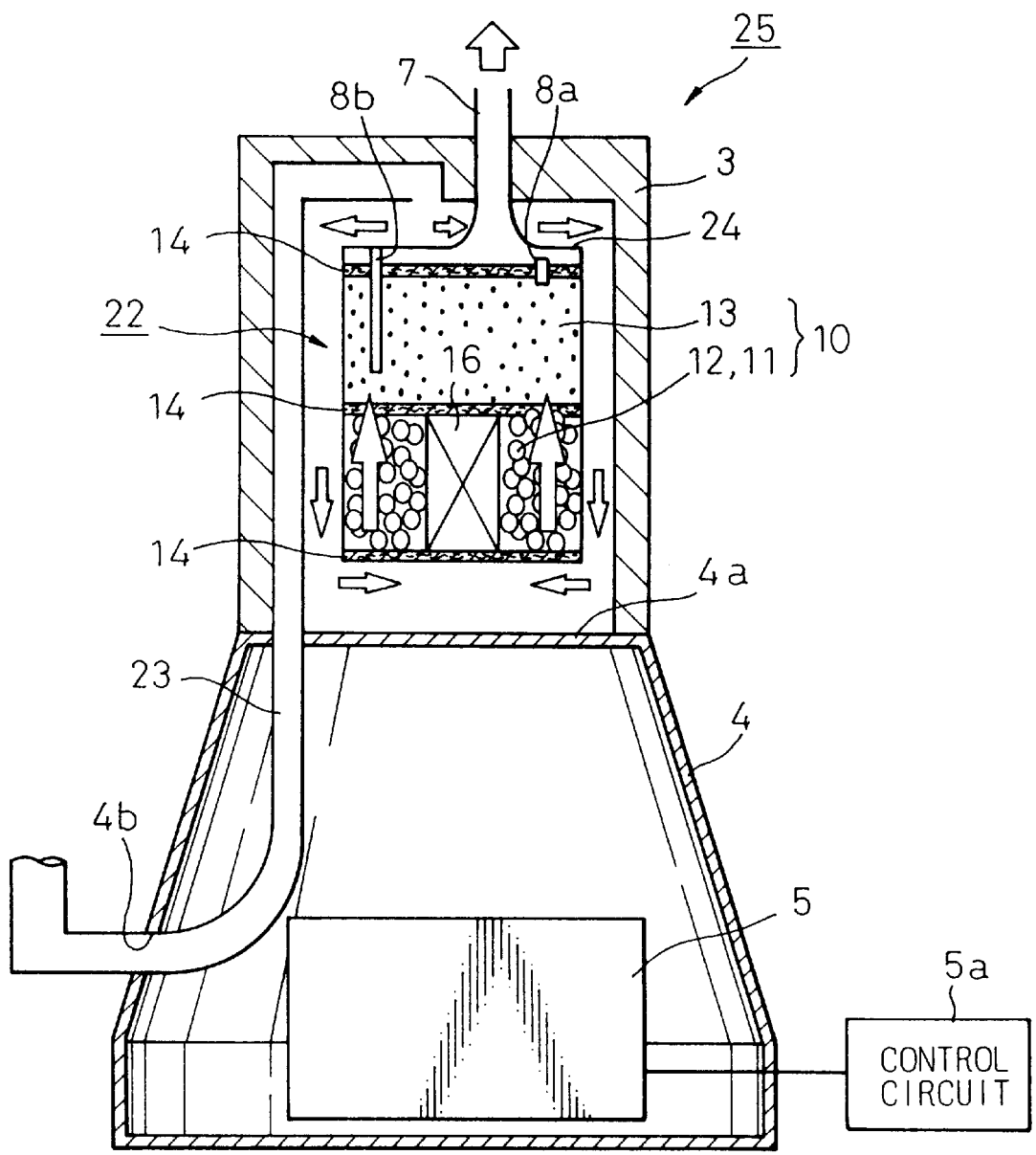
FIG. 8 is typical longitudinal sectional view of an apparatus for producing a mineral water in a third embodiment according to the present invention.

In the first and the second embodiments, the water feed pipe is connected directly to the cartridge. FIG. 8 shows an apparatus for producing a mineral water 25 according to the third embodiment, parts like or corresponding to those of the first embodiment are designated by the same reference characters. A top housing 3 has substantially the same construction as the second embodiment. In the third embodiment, plain water is supplied into the top housing 3 instead of directly supplying plain water into the cartridge through a water feed pipe connected to the bottom of the cartridge. The plain water supplied into the top housing 3 then flows into a mineral supply unit 22.

A water feed pipe 23 connected to a faucet, not shown, extends upwardly through a partition plate 4a and along the inner surface of the side wall of the top housing 3 to direct the plain water into an upper portion of the interior of the top housing 3. The inside space of the top housing 3 is filled with the plain water. The mineral supply unit 22 in the form of a cylinder within the top housing 3 is filled with the plain water. The mineral supply unit 22 has a bottom wall provided with a plurality of openings, not shown, through which the plain water flows into the mineral supply unit 22.

The other constitution of the third embodiment is the same as the first embodiment. Hence a further description regarding the constitution of the third embodiment will be omitted.

The plain water supplied into the upper portion of the inside space of the top housing 3 through the water feed pipe 23 flows downwardly as indicated by the arrows in FIG. 8. Then, the plain water flows through the openings formed in the bottom wall of the mineral supply unit 24 into the mineral supply unit 22 to flow upwardly as indicated by the arrows in FIG. 8 through the interior of the mineral supply unit 22. Mineral components dissolve in the raw water, and chlorine and impurities are removed from the plain water in the mineral supply unit 22 to prepare a mineral water. The mineral water is discharged out of the apparatus 25 for producing a mineral water through a mineral water discharge pipe 7.

Since all the openings formed in the bottom wall of the cartridge 9 to receive the plain water into the mineral supply unit 22 open into the interior of the top housing 3, the plain water supplied into the top housing 3 flows through the openings of the bottom wall of the mineral supply unit 24 into the mineral supply unit 22. Such a manner of supplying plain water through the interior of the top housing 3 into the mineral supply unit 22, as compared with the manner of directly supplying plain water from the water feed pipe 23 into the mineral supply unit 22, allows the plain water to pass more uniformly. This promotes dissolution of the mineral components of the mineral elements efficiently in the plain water.

The preferred embodiment of the invention is described with reference to the accompanied drawings. The invention is not limited by the embodiment, and it should be understood by those skilled in the art that many modifications and variations can be carried out without departing the spirit and the scope of the invention.

For example, although, in the first embodiment, the control valve is disposed in the branch pipe to control the flow rate of plain water directed to the respective branch pipes, the flow rate of the raw water can be adjusted by a three-way valve, not shown, provided at the junction of the water feed pipe and each branch pipe. The flow rate of plain water directed to the respective branch pipes can also be controlled by adjusting a solenoid valve, not shown, placed in each branch pipe. Thus, in those cases, the mode of operation and effect of the invention are the same as those of the first embodiment.

Although in the foregoing embodiments, granite porphyry and coral limestone is used as the mineral elements, another mineral material can be used to meet a user's requirements and liking, and there is no particular restriction on the types of mineral supply materials.

Although in the foregoing embodiments, there are provided with the two types of mineral supply layers, and the water purifying layer, there is no particular limitation on the types and the number of the mineral and water purifying layers. The apparatus for producing a mineral water of the present invention may be provided with only a mineral supply layer and not provided with any water purifying layer.

Although in the first embodiment, there is provided with the single cartridge having the layers of a plurality of types of mineral elements, an apparatus for producing mineral water in accordance with the present invention can be provided with a plurality of cartridges each of which contains a different types of mineral elements in a parallel arrangement and the flow rate of the plain water directed to the respective cartridges may be controlled by flow controlling means, such as a valves or valves.

There is a possibility that the cartridge is heated to a high temperature, or load on the ultrasonic source increases to reduce the life of the ultrasonic source, if the ultrasonic source is activated to apply ultrasonic waves to the mineral elements while no water is filled in the cartridge. In order to eliminate this, a flow sensor may be provided, in the water feed pipe or the mineral water discharge pipe, for detecting the flow therethrough. The ultrasonic source may be activated only while the flow rate of water through the water feed pipe or the mineral water discharge pipe is higher than a predetermined value.

Although the ultrasonic source in the foregoing embodiments is attached adhesively to the top wall of the vibrations transmission case, the ultrasonic source may be secured to the inner surface of any one of the walls of the vibrations transmission case and there is no particular restriction on the position of the ultrasonic source. However, in view of uniform transmission of the vibrations of the ultrasonic source, it is desirable to secure the ultrasonic source to the top or bottom wall of the vibrations transmission case.

Although the vibrations transmission case is attached to the bottom wall of the cartridge in the foregoing embodiments, the vibrations transmission case need not necessarily disposed on the bottom wall of the cartridge.

Although the vibrations transmission case is disposed within the cartridge with the top wall and the cylindrical side wall in contact with the mineral elements in the foregoing embodiments, the vibrations transmission case may be disposed within the cartridge with only the cylindrical side wall thereof in contact with the mineral elements, and there is no particular limitation on the dimensions of the vibrations transmission case.

Although the vibrations transmission case employed in the foregoing embodiments has a cylindrical shape, the shape of the vibrations transmission case is not limited thereto.

Furthermore, there is no particular limitation on the flowing directions of water in the apparatus for producing a mineral water, such as the direction of supply of plain water into the housing and the direction of discharging mineral water from the case, provided that the housing has an internal structure that prevents plain water and mineral water mixing with each other.

We claim:

1. An apparatus for producing a mineral water comprising:
   a mineral source having a mineral element containing a soluble mineral component;
   means for feeding plain water to the mineral source; the mineral component dissolving in the plain water when the soluble mineral of the mineral element is brought into contact with the plain water;
   an ultrasonic source for applying ultrasonic waves to the mineral source;
   adjustable control means coupled to said ultrasonic source for controlling the conditions for applying ultrasonic waves to the mineral source to produce a desired concentration of dissolved minerals in the plain water; and
   a discharge pipe in flow communication with said mineral source for discharging water containing dissolved minerals from said mineral source.

2. An apparatus for producing a mineral water comprising:
   a multiple mineral source which has a plurality of layers of mineral elements containing soluble mineral components, the plurality of layers of mineral elements being different from each other in dissolving property and/or content of the mineral components;
   a water feed pipe through which plain water is fed to the multiple mineral source;
   a plurality of branch pipes branched from the water feed pipe and connected to the multiple mineral source to direct the plain water into the respective processing layers;
   means for controlling the flow rate of the plain water directed to the respective branch pipes; and
   a discharge pipe in flow communication with said multiple mineral source for discharging water containing dissolved minerals from said multiple mineral source.

3. An apparatus for producing a mineral water according to claim 2 further comprising:
   an ultrasonic source for applying ultrasonic waves to the multiple mineral source; and
   means for controlling the conditions for applying ultrasonic waves to the mineral source.

4. An apparatus for producing a mineral water according to claim 2, wherein the flow controlling means comprises at least one control valve disposed in one of the branch pipes to control the flow rate of the plain water directed to the one of the branch pipes.

5. An apparatus for producing a mineral water according to claim 4, wherein the at least one control valve is a plurality of control valves each disposed in a respective branch pipe.

6. An apparatus for producing a mineral water according to claim 2, wherein the control valve is disposed at a junction between the water feed pipe and at least one of the branch pipes.

7. An apparatus for producing a mineral water according to claim 2, wherein the multiple mineral source further includes a layer of a water purifying material which is disposed downstream of the layers of the mineral elements with respect to the flow direction of the supplied plain water.

8. An apparatus for producing a mineral water according to claim 2 wherein the mineral source includes a cartridge for enclosing the mineral elements, and a vibrations transmission case disposed within the cartridge to contact the mineral elements at the outer surfaces thereof; and the ultrasonic source being secured to the inner surface of the vibrations transmission case.

9. An apparatus for producing a mineral water according to claim 8 wherein the cartridge and the vibrations transmission case are cylindrical hollow members concentric with each other with the mineral elements therebetween.

10. An apparatus for producing a mineral water according to claim 8, wherein the vibrations transmission case is secured to a position in the inner surface of the cartridge; and
   the ultrasonic source being secured to the inner surface of the vibrations transmission case at a position opposite to the portion of the vibrations transmission case where it is secured to the inner surface of the cartridge.

11. An apparatus for producing a mineral water according to claim 8, wherein at least two of the layers of the mineral elements contact the outer surface of the vibrations transmission case.

* * * * *